United States Patent [19]

Li

[11] Patent Number: 5,787,275

[45] Date of Patent: Jul. 28, 1998

[54] IDENTIFYING MULTIPLE LEVEL CLASS RELATIONSHIPS IN AN OBJECT ORIENTED SYSTEM USING ICONS AND LINES TO REPRESENT CLASS RELATIONSHIPS

[75] Inventor: Shih-Gong Li, Cupertino, Calif.

[73] Assignee: International Business Machines Corporation, Armonk, N.Y.

[21] Appl. No.: 747,314

[22] Filed: Nov. 12, 1996

Related U.S. Application Data

[62] Division of Ser. No. 454,792, May 31, 1995, Pat. No. 5,640,558.

[51] Int. Cl.[6] .................................................. G06F 17/30
[52] U.S. Cl. .......................... 395/614; 395/612; 395/611; 395/683; 364/275.5; 364/282.1
[58] Field of Search ............................... 395/615, 357, 395/334, 604, 800, 133, 348, 612, 683, 614, 500, 613; 364/275.5, 282.1

[56] References Cited

U.S. PATENT DOCUMENTS

| | | | |
|---|---|---|---|
| 5,237,654 | 8/1993 | Shackleford et al. | 395/357 |
| 5,317,732 | 5/1994 | Gerlach, Jr. et al. | 395/615 |
| 5,418,950 | 5/1995 | Li et al. | 395/604 |
| 5,421,008 | 5/1995 | Banning et al. | 395/604 |
| 5,428,737 | 6/1995 | Li et al. | 395/604 |
| 5,452,468 | 9/1995 | Peterson | 395/800 |
| 5,467,411 | 11/1995 | Stone et al. | 395/133 |
| 5,485,567 | 1/1996 | Banning et al. | 395/604 |
| 5,535,403 | 7/1996 | Li et al. | 395/800 |
| 5,546,526 | 8/1996 | Li et al. | 395/348 |
| 5,553,218 | 9/1996 | Li et al. | 395/613 |
| 5,555,370 | 9/1996 | Li et al. | 395/334 |
| 5,557,731 | 9/1996 | Li et al. | 395/613 |
| 5,627,979 | 5/1997 | Chang et al. | 395/335 |
| 5,640,558 | 6/1997 | Li | 395/612 |

*Primary Examiner*—Thomas G. Black
*Assistant Examiner*—Charles L. Rones
*Attorney, Agent, or Firm*—Jeffrey S. LaBaw

[57] ABSTRACT

A system and method for identifying class relationships in an object oriented system. An object oriented program in an object oriented source code language is parsed for the immediate class relationship data. The immediate class relationship data is stored in a relation data library. In response to a user query, a derive engine is employed to derive multiple level class relationship data from the immediate class relationship data. The multiple class relationship data is presented on a system display to the user. As the number of immediate class relationships captured by the parser will be overwhelmingly huge in the case of a huge object oriented system, the derivation step is preferably divided into two. In anticipation of the user query, the immediate relationship data for each class of object is preprocessed and stored in a facts library according to class and type of relationship. This facts library is traversed by the derive engine in response to the user query to derive the multiple level class relationship data.

20 Claims, 6 Drawing Sheets

IDENTIFYING MULTIPLE LEVEL CLASS RELATIONSHIPS IN AN OBJECT ORIENTED SYSTEM USING ICONS AND LINES TO REPRESENT CLASS RELATIONSHIPS

DESCRIPTION

This application is a divisional of Ser. No. 08/454,792, filed May 31, 1995, and now U.S. Pat. No. 5,640,558.

BACKGROUND OF THE INVENTION

This invention relates generally to object oriented programming. More particularly, it relates to a class relationship tool for identifying and analyzing the class relationships for an object oriented system without requiring compilation.

Object oriented programming is one of the most important new technologies in software development. Object oriented programming offers significant capabilities in increasing programmer productivity and software code reuse. In object oriented programming, data and methods that operate on the data are combined into packages called "objects". By standardizing the messaging paths with which the objects communicate and limiting the interaction between objects to the standard paths, object oriented programming removes much of the complexity of traditional procedurally oriented programming.

A brief overview of some of the more important aspects of object oriented programming are provided below. More detailed discussions are available in many publicly available documents including *Object Oriented Design With Applications* by Grady Booch, Benjamin/Cummins Publishing Company, 1991 and *Object Oriented Requirements Analysis and Logical Design* by Donald G. Firesmith, John Wiley and Sons, Inc., 1993. An object includes a set of data which may be called "attributes" and a set of operations called "methods" which operate on the data. An object's data may generally change only through the operation of the object's methods. The combination of data and methods and objects is called "encapsulation". Through encapsulation, data within an object can only be changed by the methods associated with that object. The theory is that when the behavior of an object is confined to defined locations and interfaces, code modifications in the objects will have minimal impact on the other objects and elements in the system. Encapsulation also offers code which is more modular and maintainable than code written using more procedural techniques.

Another basic concept of object oriented programming is the "class". A class includes a set of data attributes, plus a set of allowable methods on the data attributes. Each object is usually an instance of some class. A class may be derived from another class in a process called "subclassing" or "inheritance". The subclass inherits the data attributes and methods of the parent or base class. A subclass typically adds code which overrides the data and/or methods of the base class or adds new data attributes and methods. As new subclasses are created, greater levels of specialization are provided. Through inheritance, developers may minimize the amount of new code needed to write an application program. As a significant portion of the functions needed for a particular task is provided in the base classes or some other class in the inheritance hierarchy, the programmer has a head start in program design and creation.

However, as classes begin to proliferate in a huge object oriented system, it is not unusual to have thousands of classes. It is often difficult to understand the relationship between two objects in the class hierarchy. Compounding the problem are the encapsulation and information hiding which are typical characteristics of object oriented systems. Identifying the relationships between classes becomes crucial for understanding, using and testing the system. Class relationships are often transitive. In a system with over a thousand classes, it is not difficult to find class relationships with long paths. This also increases the difficulty and complexity in identifying class relationships. Most existing tools for identifying class relationships in an object oriented system are of a browser type. There is a fundamental problem using browsers for huge object oriented systems: immediate class relationships are captured by the compiler. Thus, compilation becomes a prerequisite condition which is hard to satisfy since most object oriented programming language compilers are still not fully compatible to each other.

Therefore, there exists a need for a technique for identifying and analyzing class relationships in object oriented systems without requiring compilation.

SUMMARY OF THE INVENTION

Therefore, it is an object of the invention to identify and analyze class relationships in a huge object oriented system without compilation.

It is another object of the invention to efficiently handle a huge set of class relationships.

It is another object of the invention to allow sufficient flexibility in design for incremental development to account for changes in the object oriented system as it matures.

It is another object of the invention to allow porting of object oriented software between platforms.

These and other objects are accomplished by a system and method for identifying class relationships in an object oriented system. First, an object oriented program in an object oriented source code language is parsed for the immediate class relationship data. The immediate class relationship data is stored in a relation data library. In response to a user query, a derive engine is employed to derive multiple level class relationship data from the immediate class relationship data. The multiple class relationship data is presented on a system display to the user.

As the number of immediate class relationships captured by the parser will be overwhelmingly huge in the case of a huge object oriented system, the derivation step is preferably divided into two. In anticipation of the user query, the immediate relationship data for each class of object is preprocessed and stored in a facts library according to class and type of relationship. This facts library is traversed by the derive engine in response to the user query to derive the multiple level class relationship data.

BRIEF DESCRIPTION OF THE DRAWINGS

These objects, features and advantages will be more readily understood with reference to the attached figures and following description.

DETAILED DESCRIPTION OF THE PREFERRED EMBODIMENT

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2 (™) series of computers could be used in the present invention. For additional information on IBM's PS/2 series of computers, the reader is referred to *Technical Reference Manual Personal Systems/2* Model 50, 60 Systems IBM Corporation, Part No. 68X2224 Order Number S68X-2224 and *Technical Reference 2 Manual Personal Systems/2 (Model 80)* IBM Corporation Part No. 68X 2256 Order Number S68X-2254. One operating system which an IBM PS/2 personal computer may run is IBM's OS/2 2.0 (™) for more information on the IBM OS/2 2.0 Operating System the reader is referred to *OS/2 2.0 Technical Library, Programming Guide Vol.* 1, 2, 3 Version 2.00 Order Nos. 10G6261, 10G6495, 10G6494.

In the alternative, the computer system might be in the IBM RISC System/6000 (™) line of computers which run on the AIX (™) operating system. The various models of the RISC System/6000 is described in many publications of the IBM Corporation for example, *RISC System/6000, 7073 and 7016 POWERstation and POWERserver Hardware Technical* reference, Order No. SA23-2644-00. The AIX operating system is described in *General Concepts and Procedure— AIX Version 3 for RISC System/6000* Order No. SC23-2202-00 as well as other publications of the IBM Corporation.

Figure 1:
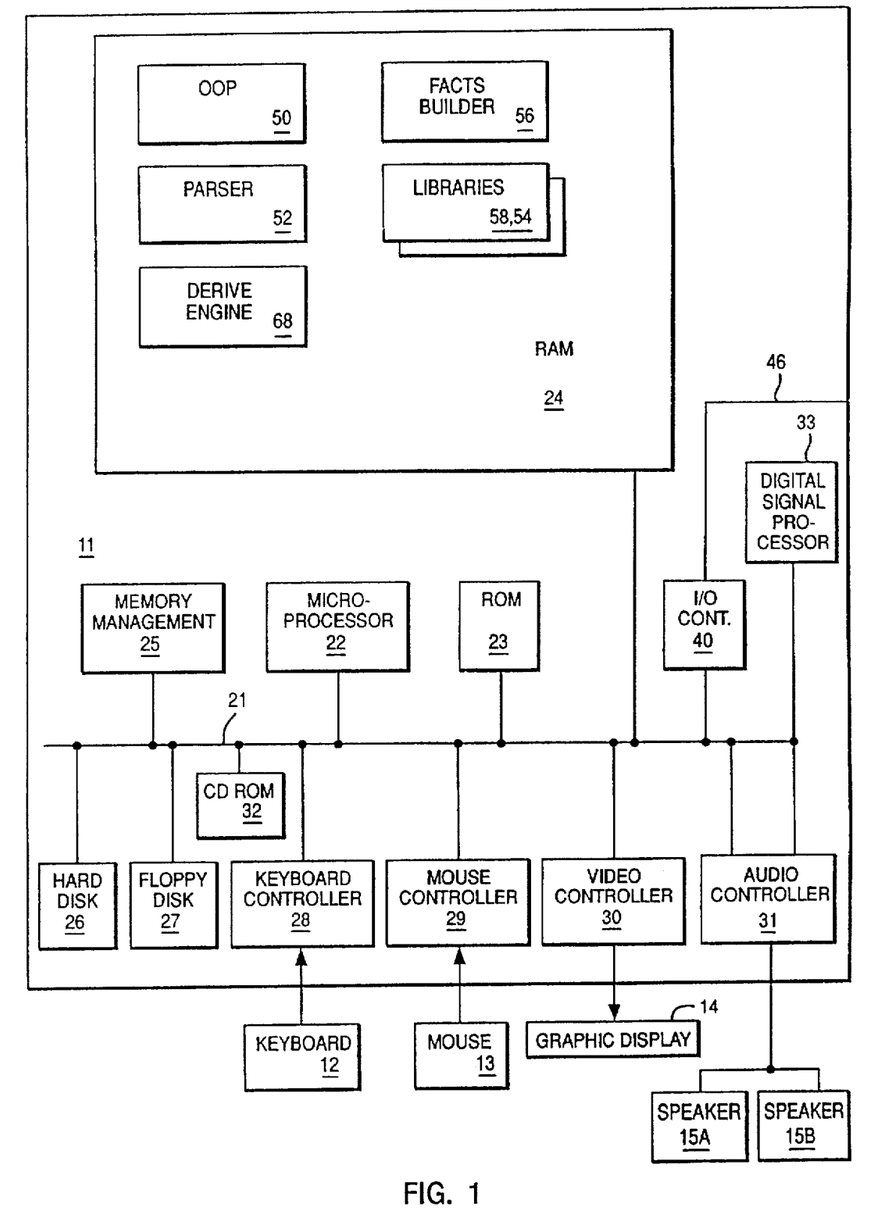
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors such as the PowerPC™ chips manufactured by IBM™, or others by Hewlett Packard™, Sun™, Motorola™ and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 50, 52, 54, 56, 58, 68 resident in the random access memory 24 of one or more computer systems configured generally as described above. Until required by the computer system, the sets of instructions may be stored in another computer memory, for example, in the hard disk drive 26, or in a removable memory such as an optical disk for eventual use in the CD-ROM 32 or in a floppy disk for eventual use in the floppy disk drive 27. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements. Further, the invention is sometimes described in terms that could be associated with a human operator. No action by a human operator is desirable in any of the operations described herein which form part of the present invention; the operations are machine operations processing electrical signals to generate other electrical signals.

Figure 2:
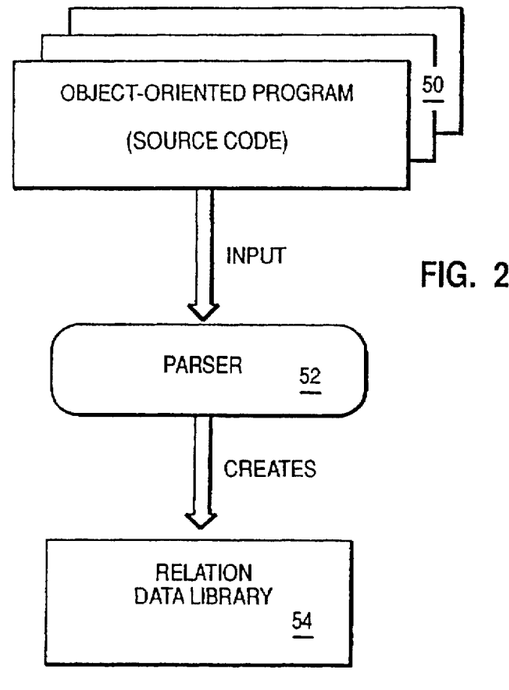
FIG. 2 illustrates the overall process for parsing the object oriented program to identify the class relationships therein and storing those relationships in a relation data library.

FIG. 2 shows the overall process for analyzing the object oriented program 50 with the parser 52 to generate the relation data library 54. The object oriented program 50 is typically source code in an object oriented language such as C++. The parser 52 is designed to understand class definitions and method implementations for capturing immediate class relationships. In the preferred embodiment, the invention is designed modularly so that the requisite modules can be selected and changed as necessary without impacting other modules. For example, the parser 52 is designed for a specific object oriented programming language. Depending on the object oriented program 50 to be analyzed, a suitable parser is chosen. Also, any changes in the object oriented language conventions can be accommodated by changing the parser without affecting any other module.

The parser 52 does not need to cover the amount of information which a compiler must address; it only needs to capture the dependency relationships in the source code. Thus, the parser is much faster and simpler to implement than a compiler written for a comparable purpose. A parser is typically considered as part of a compiler. In the case of this invention, the parser will be defined based on the target programming language s specification, which determines the grammatical rules, the reserved keywords, the lexical rules, and the syntax. Among the existing OO programming languages, the definition and usage of templates in C++ demonstrates a case of high complexity for the parser. However, the parser in this invention is still much simpler than a compiler, since the output generated by the parser will be used for further analysis of class relationships, instead of being used for generating machine-executable code. The parser's main responsibility is to parse the syntax and generate symbols and storing symbols in the format that expresses the relationships among relevant symbols. A compiler would use the information generated by parser, as well as information generated by other utilities in the compiler. These information include the creation, initial values, and destroy of the data structures used in a program. The end goal of a compiler is to generate machine executable code.

The parser needs: the target language's specification, an effective and robust way for handling the language's grammar, an effective symbol library that can store symbol data generated from parsing and can be used for retrieving data in parsing more relevant code, as well as general requirements for any parser Such as reserved keywords, standard library functions included in he programming language, etc.. Parsing algorithms and parsers in general are well known to the art and part of standard computer science education. One skilled in the art could easily design a parser for a given object oriented language given the description provided herein.

The relationships retrieved by the parser and stored in the relation data library are preferably described in a predicate form: predicate name (arg1, arg2, . . . ). Those skilled in the art would appreciate that library should be construed as encompassing a database or other suitable storage area for the class relationships. Examples of the type of class relationships include inheritance usage and implementation usage relationships although these examples are not meant to be exclusive.

(a) inheritance relationship inheritance (Class-A,Class-B, Inheritance-Type). which means that Class-A inherits from Class-B with Inheritance-Type.

For example, inheritance (Scroll Bar, Window, Public). describes that class Scroll Bar inherits from class Window with type Public. In C++, this means that every Public-access member of class Window is now a Public-access member of class Scroll Bar and every Protect-access member of class Window is now a Private-access member of class Scroll Bar.

(b) Usage relationship use (Class-A, Class-B, Use-Type, Use-In-Method, #-of-occurrences).
For example.
use (Window, DeviceContext, return-value, GetDevContext,1).

describes that Class Window uses an object of Class DeviceContext as the return of GetDevContext method. Typically, there are 4 types of usage relationships that should be captured by the parser:

(i) return-value
(ii) return-reference
(iii) use-value
(iv) use-reference

Usage relationships are based on the signature of member functions of a class.

In the case of a return—value usage relationship, the method returns an instance of a class for example, use (Window, DeviceContext, return-value, GetDevContext, 1)

indicates that Class Window has a method GetDevContext and this method returns an instance of class DeviceContext. Therefore, in the execution of GetDevContext method, the computer system needs to construct an object of class Devicecontext. That is, the computer system needs to know the detailed definition of class DeviceContext to instantiate an object in the machine's memory and load in the code that contains the detailed definition.

In the case of a return-reference usage relationship, the method returns the machine address of an object of a class. For example, use (Window, PlatWindow, return-reference, GetParent, 1)

indicates that Class Window has a method GetParent which returns a pointer (address) to an object of Class PlatWindow. In this case, as long as there is a valid address of an object of class PlatWindow, the computer system does not need to load in the definition of class PlatWindow.

In the case of a use—value usage relationship, the method uses an instance of a class as one of its arguments. For example, use (Window, CurveLine, use-value, DrawCarve,1)

indicates that class window has a DrawCarve method that needs an instance of Class CurveLine. The computer system needs to have an object of CurveLine in its memory for executing the DrawCurve method.

In the case of a use-reference relationship, the method has a reference of an object of a class in its arguments. For example, use (Window, DeviceContext, use-reference, Draw,1)

indicates that eh Draw method of class Window needs to have a reference to an instance of the class Device Context. In executing the Draw method of class Window, the computer system needs a valid address of an object of Class Device Context. Whether the system needs to load in the code of Class Device Context will depend on the detailed implementation and other passed-in arguments of the Draw method.

(c) Implementation Usage Relationship imp (Class-A, Class-B, Use-Type, Use-In-Method, #-of-occurrences)

Implementation Usage captures the usage relationships that occurred only in the implementation body of the object rather than in the method's interface for example, in C++ syntax, class window has a method GetBackColor as:

| Color Window::GetBackColor() | where PS is used |
| { hps PS = gETps(); | in the implementation, |
| { return QueryBackColor (ps); | but not used in |
| | the signature. |

An implementation body of a method can be distinguished from the signature of a method. The implementation body is the details of the implementation of the method, whereas the "signature" describes the interface of the method. In other words, the signature describes the input and output of a method, while the implementation body defines the exact logic and conditions of the execution of a method. Parsers within the object oriented compilers do not parse the implementation body as this information is unimportant at this step of the overall process of compilation.

Since imp( ) and use( ) both cover usage relationships, a reasonable practice is:

(i) use( ) describes the usage relationships that described in the class declaration of an object.
(ii) imp( ) catches the usage relationships that are not included in use( ) but exist in the method's implementation body.

Figure 3:
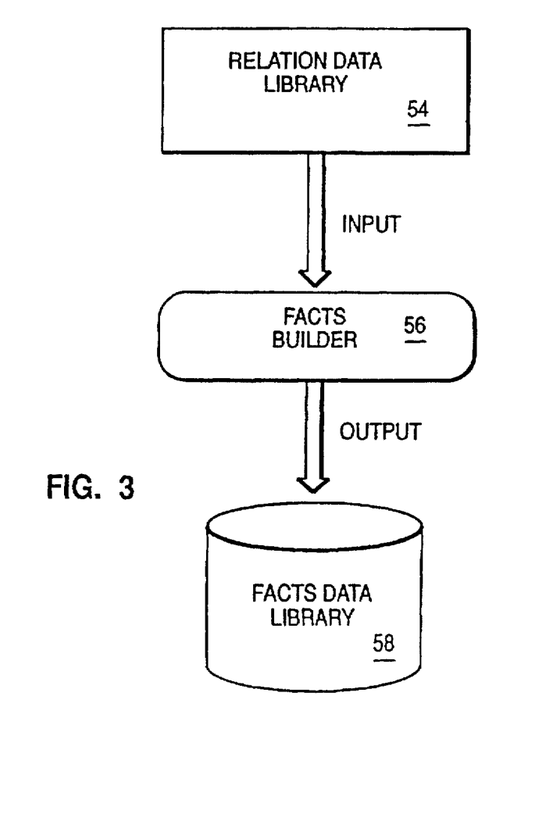
FIG. 3 shows the overall process of generating the facts data library from the relation data library.

For a huge object oriented system, the immediate relationships captured by the parser and stored in the relation data library will be overwhelmingly large already. It will likely require a large amount of memory to load them all simultaneously. Therefore, a "divide-and-conquer" approach is adopted in the preferred embodiment. The first portion of the derive engine, the facts builder 56, preprocesses the immediate relationships stored in the relation data library 54 and stores them in a facts data library 58 by class and/or type of relationship as shown in FIG. 3. As the relation data library can be considered as raw data generated by the parser, the Facts Data Library can be viewed as information organized in a specific way suitable for further use. Since most dependency relationships are about classes, the Facts Data Library generated from the relation data library is preferably organized in a class-oriented fashion. The preprocessing steps required to generate the Facts Data library include: (1) generating a collection list of classes (2) enhancing the list of classes by adding the maximal level of inheritance of each class in the inheritance tree. As multiple inheritance is allowed in most OO programming languages, this increases the complexity of the inheritance tree of an OO system. A class may inherit from multiple parents, and there can exist more than one path from a "root" base class to the particular class. The length of a path in this inheritance tree indicates the level of inheritance of the particular class the length of the largest path of a particular class will be chosen to represent the maximal level of inheritance of that class. Then, as discussed below, the derive engine traverse the facts data library to derive multiple level class relationships.

In one preferred embodiment, the Facts Data Library includes inheritance relationship data, depend level relationship data and dependance level relationship data.

(1) Inheritance relationship data is described above in connection with the data library, e.g., inheritance(Class-A, Class-B, Inheritance-Type).

(2) Depend-level relationship data (class-oriented)

depend (Class-A, Level, List-A).

which describes that List-A is a list structure that contains information of class Class-A's dependency at the level of Level.

For example, based on the following data in the relation data library:

---
inheritance (ClassA, ClassX, public).
use( classA, classC, return-ref, getC,1).
use( classA, classB, use-value, setC, 1).
use( classA, classD, use-ref, setC, 1).
use( classC, classB, use-value, constructor,1).
use( classC, classD, use-ref, constructor,1).
imp( classC, classE, use-ref, constructor,1).
use(classD, classF, use-value, constructor,1).
use(classE, classG, use-ref, constructor,1).
    (not a complete description of the
    Relationship Data Library)
---

The facts builder will generate:
depend (A, 1, L1).
depend (A, 2, L2).
depend (A, 3, L3).

where L1 can be described as a list including the following:

and L2 can be described as including the following:

where Lx1 is in
    depend (ClassX, 1, Lx1).

The Facts Data Library should include information to over at least one level "depend-level relationship data" or every class in the examined object oriented program That is, for each class X, there is a depend (X, 1, List-X) in the Facts Data Library.

The Facts builder can generate and store more than 1 level depend information for each class into the Facts Data Library with the system capacity and other factors considered.

(3) dependee-level relationship data
    impact (Class-A, Level, List-A).
List-A describes the list of <ClassName, Type> pairs that classClassName has a type dependency relationship indicating that Class ClassName depends on Class-A and this is a level dependency.

Note that impact ( ) describes the opposite direction of dependency as described by depend( ).

Figures 4A, 4B:
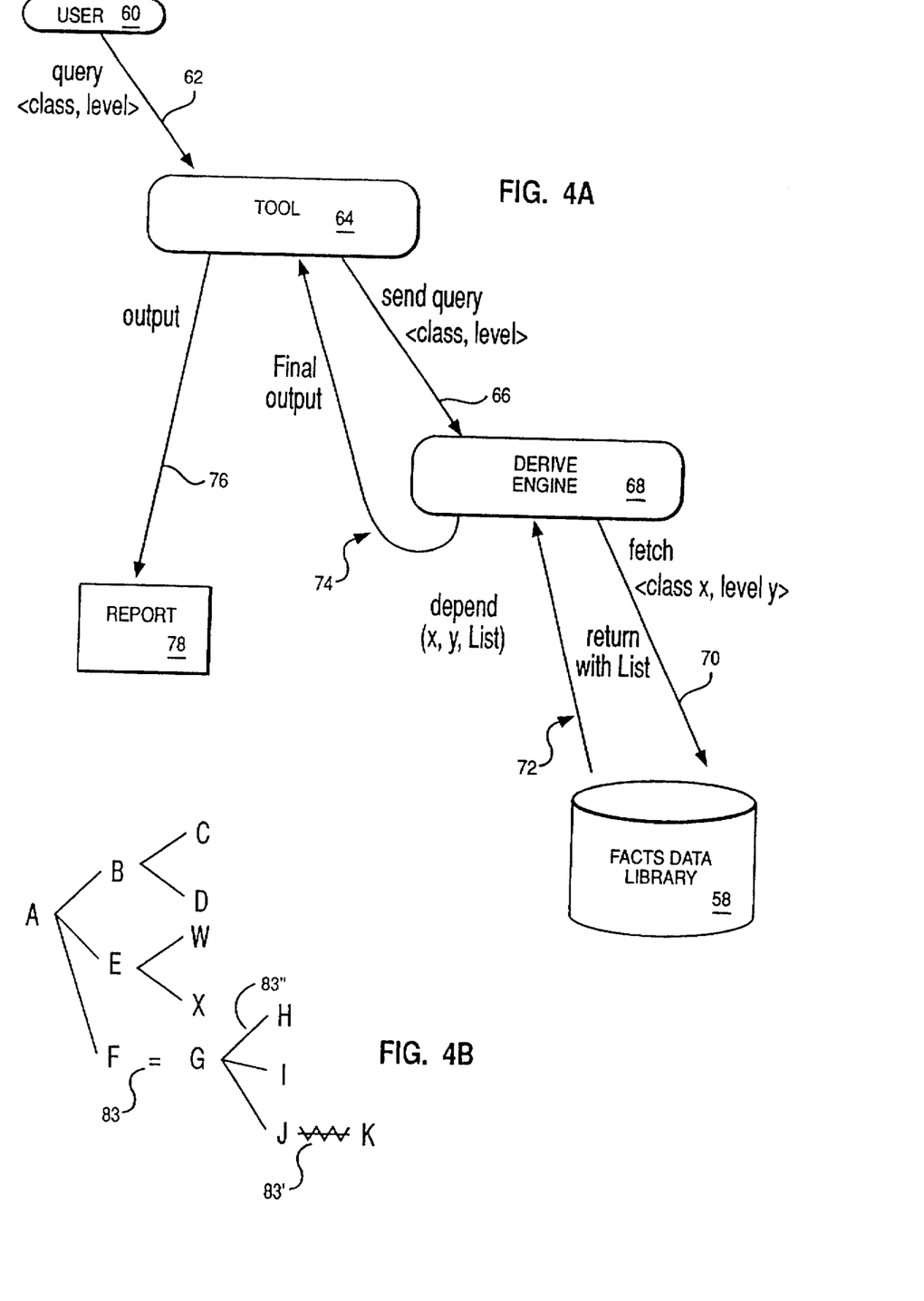
FIG. 4A depicts the process for answering a user query for a class relationship.
FIG. 4B shows one possible output format for summarizing the class relationships.

FIG. 4 shows the process initiated by a user query for a class relationship according to the invention. A user at a workstation 60 asks for a class relationship between two objects in an object oriented system in a query 62 for the class and level of the relationship. Other information can also be requested such as a complete list of classes which depend on a given class or a complete list of classes which have to be instantiate to be used by a given class. Although the figure shows the process as though it takes place on a single workstation, one skilled in the art would appreciate that the main components of the invention, the parser, the derive engine and the various libraries may be located at a more powerful server machine be cause of their size and the query function can be provided by a relatively small client at the user's workstation. One example of a query statement in command-line syntax:

| FindXXX | All | Depend | (Class name) | <Option> |
|---------|-----|--------|--------------|----------|
|         | Arg1 | Arg2  | Arg 3        | Arg 4    |

Where FindXXX is the Query Process Command Name Find Dep means find the list of dependent FindImp means find the list of impacts.

Arg1 is the scope of search. ALL indicates that the search to have indicates that the search will continue for n number maximal scope; n of levels. Arg2 is the type of dependency: e.g., inheritance (inh) return-value (rtv), return reference (rft), use-value(usv), use-reference(usf), etc. as discussed above. Arg4 is an option to specify how the information is presented; e.g., no option specified: display on screen; -s <filename> saved in file; -p print.

The query 62 is passed to a tool 64 which forwards the query 66 to the derive engine 68 in the proper format. In the preferred embodiment, the queries 62 and 63 use the query format described above. Alternatively, Query 62 could be in a format specific to a user interface to the tool. The derive engine 68 traverses 70 the facts data library 58 to derive the multiple level class relationships. This process is described in greater detail below. A list 72 of the desired class relationships is returned to the derive engine 72 from the facts library. The list 72 can be described, in the following format;

(List-1, List-2, List-3, . . . )

where

List-n: the list of level-n dependency, and can be described as:

{{className,<Occurrance>, <Type>}. . . . .}
where ClassName must exist,

<#Occurrence> and <Type> are optional, depending on the type of query is submitted. Those skilled in the art would readily appreciate that alternative formats could be used.

The tool receives the final output 74 and formats the output 76 in a pleasing and readable report 78. The final output can be in various formats. One example is an ascii format with indention. This format is suitable for displaying on screen, printing, and saving in a file. For example, the class relationships may be displayed as shown below.

```
e.g.:
A
____B            UseBy Value
____C            RtnByReF
____D            UseByRef
____E            Inheritance
____W            ImpByRef
____X            UseByRef
____F            UseBy Value
____G            RtnByRef
____H            UseByValue
____I            UseByRef
____J            Inheritance
____K            RtnByRef
```

A tree-like format as shown is FIG. 4B. This tree format is suitable for displaying on screen. It may require additional processing for printing or saving in file(s). Suitable icons are selected to represent each class. The lines 83, 83', 83" which connect the class icons may be selected to represent the class relationship, i.e., presented in different ways, e.g., highlighted, colored or otherwise emphasized to represent the different types of dependencies between classes. One skilled in the art would recognize that the icons would embrace graphics, symbols as well as alphanumeric characters.

By separating the tool 64 from the derive engine 68, the user interface is separated from the derive function. Thus, different "front ends" may be developed to present the class relationship information in different ways without necessitating redesign of the derive engine itself. Further, the derive engine itself may be enhanced in various ways. The derive engine may be enhanced to cover new kinds of queries. The derive engine may be enhanced to use new technologies developed for more efficient use of computer resources. The derive engine may also be enhanced to be suitable for a new GUI style developed for specifying queries and/or displaying query results.

Figure 5A:
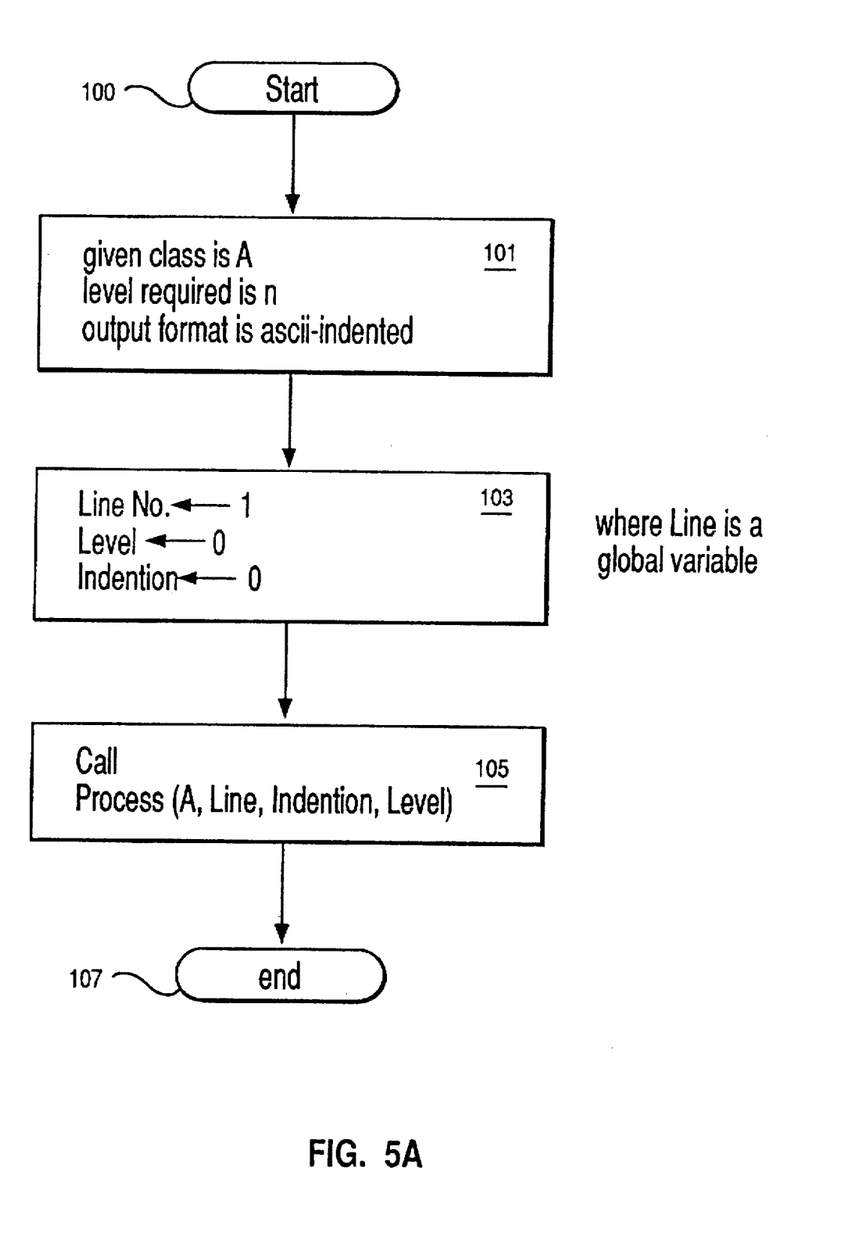
FIGS. 5A–5C are a flow diagrams of the derivation process in the derive engine.
Figure 5B:
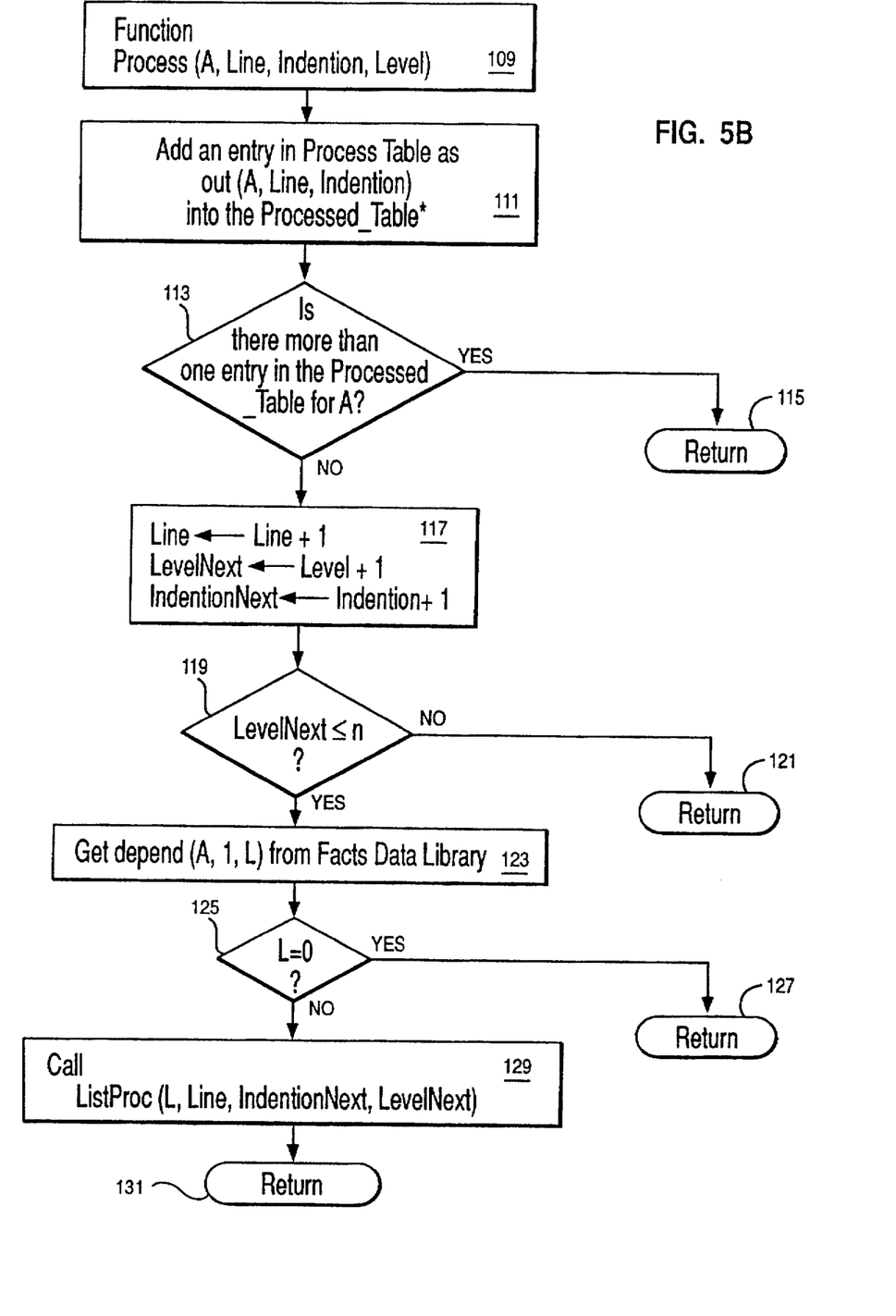
Figure 5C:
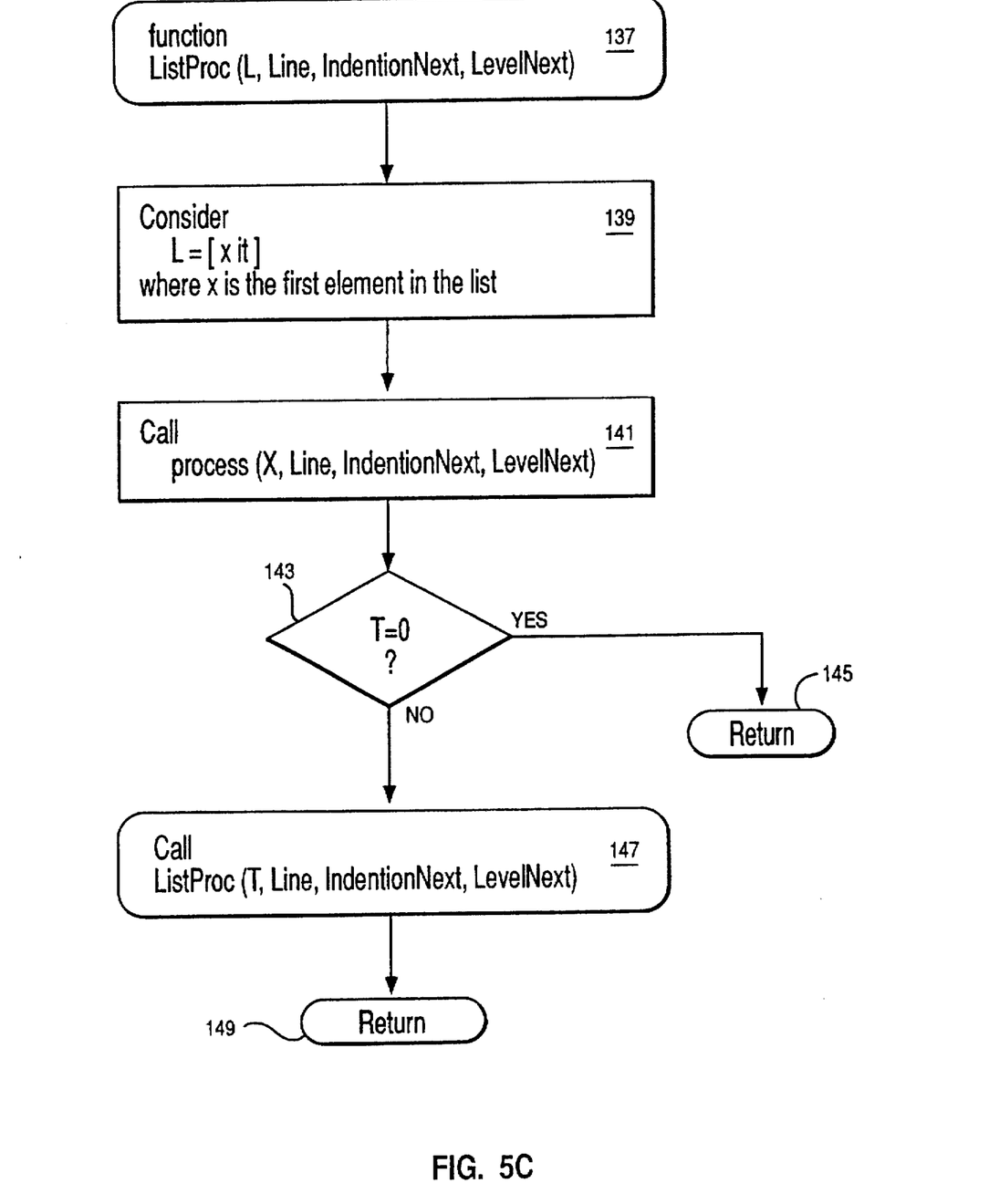

The derivation process in the derive engine is depicted in FIGS. 5A-5C. The process is invoked in step 100 when the tool sends a query to the derive engine asking for level n dependency information of class A in step 101.

The query in step 101, also specifies that the output format is ascii-indented. In step 103, the initial values for the format parameters are set. Line number is set to 1, Level is set to 0 and Indentation is set 0. In step 105, the process for assembling the output is called. This process is shown in greater detail in FIG. 5B. In step 107, the process ends.

As shown FIG. 5B, the process for assembling the output in the derive engine starts with the call specifying the class, line, indentation and level as variables in step 109. Entries are added into the Processed_Table in step 111 which contain information about the className, line number and amount of indentation. The information in this table will, of course vary, according to the nature of the query and the type of output format specified. In step 113, a test is performed to determine whether there is more than one entry in the Processed_Table for class A. If so, it means that the class has already been processed in the session and that there is no need to repeat the following steps. The process returns step 115. If there is no entry, in step 117, Line is set to Line+1, LevelNext is set to Level+1 and IndentationNext is set to Indentation+1. Next, in step 119, a test is performed to determine whether the level is less than or equal to n. If not, that is, the level is greater than n, the process has reached the required level in the class hierarchy and the process may stop. The process returns in step 121. If there are more levels to output, in step 123, the depend level relationship data is retrieved from the facts data library for (A,1,L) where (A,1,L) is the argument list for depend (A,1,L) and A=classname, 1=level number and L=List of dependency data. Next, in step 125, a test is performed to determine whether L=0 which means that the class does not have a dependency list. If L=0, in step 127, the process returns. If L is not equal to zero, then the class has a dependency list and the ListProc procedure is called in step 129. The ListProc procedure is shown in greater detail in FIG. 5C. The process in step 131 after the completion of the ListProc procedure.

As shown in FIG. 5C, the ListProc procedure, called in step 137, is a function of the dependency list, line, next indentation and next level. In step 139, the first element in the list is chosen as one of the input arguments of process functions, which is in step 141. In step 141, the assembly process shown in FIG. 5B is called, for the first element in the list. After the process is complete, a test is performed in step 143 to determine whether T=0. T is a list> If T is an empty list, then T=0 is true. If so, the process returns, step 145. If not, the ListProc process iterates for T. The process returns step 149.

The invention represents an important advance in the state of the art. Most existing tools can hardly function in a huge object oriented system that has thousands of relationships due to the huge overhead associated with the problem. In the prior art, to generate multiple class relationships, a tool will usually require disk space and memory to grow with scale of the immediate relationships exponentially. The invention does not require such exponential growth. As the appropriate parser can be selected for the source code in which the object oriented program is written, the design is compiler independent. Indeed, the invention does not call for compilation as such at all.

A parser as described above can be portable across various platforms. The parser generates much less amount of information compared with data from a typical compiler to the same object oriented programming language. However, the amount of information is still huge. It is too big to handle. The divide-and-conquer approach is effective in organizing the raw data into more usable and manageable information library for generating dependency reports. The separation of parser, tool, and derive engine is robust and flexible to meet the continuously growing environment in large-scale object-oriented software development.

The invention does not rely on compilers. In one embodiment, the system may include a collection of interchangable parsers from which the use may select the appropriate parser given the language of the object oriented program to be examined. When porting an existing object oriented product to another platform, it is important to understand the source code. However, most existing software analysis tools will require the source code to be compiled on the target platform. Presently, most object oriented programming languages are still lacking of compiler compatibility. This hinders the learning process of porting an existing object oriented software to another platform. A typical parser when incorporated in the compiler does not provide dependency relationship to help understand the structure of the code. The range and depth of information provided by the invention allows the developer to know the perquisites of porting any specific class object in a software product.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

I claim:

1. A method for presenting multiple level class relationship data of an object oriented application on a computer system display comprising the steps of:

selecting a set of icons to represent a set of classes in the multiple level class relationship data;

selecting a set of lines to represent a set of class relationships in the multiple class relationship data; and presenting the icons and lines in a tree format on the system display, wherein each line connects two icons and is presented in a manner which indicates a class relationship between the two classes represented by the respective icons, and wherein at least two lines are respectively presented in at least two different manners indicating at least two different class relationships.

2. The method as recited in claim 1 wherein at least two of the lines are presented in different colors.

3. The method as recited in claim 1 wherein at least two of the lines are emphasized in different manners.

4. The method as recited in claim 1 wherein a first line represents a usage relationship.

5. The method as recited in claim 4 wherein a second line represents an implementation usage relationship.

6. The method as recited in claim 5 wherein a third line represents an inheritance relationship.

7. The method as recited in claim 1 wherein the multiple class relationship data is a result of parsing an object oriented application.

8. A system including processor, memory and display for presenting multiple level class relationship data of an object oriented application on a computer system display comprising the steps of:

means for selecting a set of icons to represent a set of classes in the multiple level class relationship data;

means for selecting a set of lines to represent a set of class relationships in the multiple class relationship data; and means for presenting the icons and lines in a tree format on the system display, wherein each line connects two icons and is presented in a manner which indicates a class relationship between the two classes represented by the respective icons, and wherein at least two lines are respectively presented in at least two different manners indicating at least two different class relationships.

9. The system as recited in claim 8 wherein the computer system display is a client system coupled to a network which is coupled to a server system where the class relationship data is stored.

10. The system as recited in claim 9 further comprising means for querying the server system for class relationship data.

11. The system as recited in claim 8 wherein at least two of the lines respectively represent at least two different usage relationships and are respectively presented in two different manners.

12. The system as recited in claim 8 wherein at least two of the lines represent at least two different implementation usage relationships and are respectively presented in two different manners.

13. The system as recited in claim 8 wherein at least one of the lines is presented as a double parallel line.

14. A computer program product in a computer readable medium for presenting multiple level class relationship data of an object oriented application on a computer system display comprising the steps of:

means for selecting a set of icons to represent a set of classes in the multiple level class relationship data;

means for selecting a set of lines to represent a set of class relationships in the multiple class relationship data; and means for presenting the icons and lines in a tree format on the system display, wherein each line connects two icons and is presented in a manner which indicates a class relationship between the two classes represented by the respective icons, and wherein at least two lines are respectively presented in at least two different manners indicating at least two different class relationships.

15. The product as recited in claim 14 wherein the icons are selected from a group of alphanumeric characters.

16. The product as recited in claim 14 wherein a plurality of usage relationships are represented in the tree format, each usage relationship presented in a different manner.

17. The product as recited in claim 16 wherein one of the usage relationships is a return-value usage relationship.

18. The product as recited in claim 17 wherein one of the usage relationships is a return reference usage relationship.

19. The product as recited in claim 14 wherein the computer readable medium is a CD-ROM.

20. The product as recited in claim 14 wherein inheritance, usage and implementation usage class relationships are presented in different manners.

* * * * *